(No Model.) 2 Sheets—Sheet 1.
A. T. GIFFORD.
MILLING MACHINE.
No. 330,391. Patented Nov. 17, 1885.
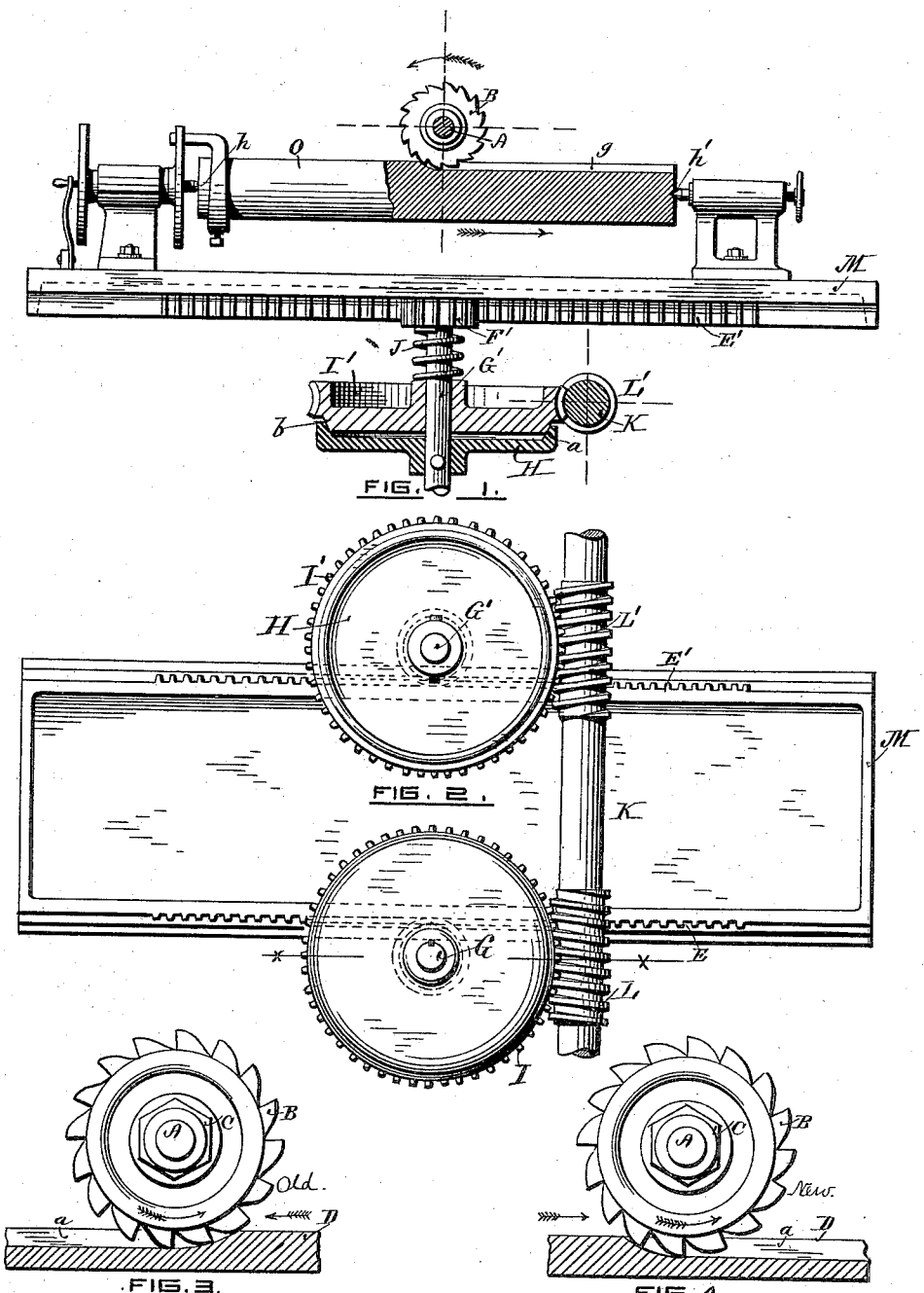
WITNESSES:
Chas. F. Schmelz
George W. Winsor
INVENTOR:
Alonzo T. Gifford
per S. Scholfield
Attorney (No Model.)
2 Sheets—Sheet 2.
A. T. GIFFORD.
MILLING MACHINE.
No. 330,391. Patented Nov. 17, 1885.
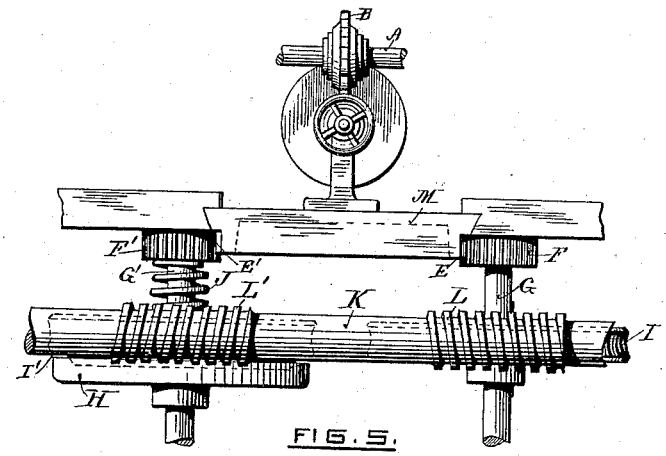
FIG. 5.
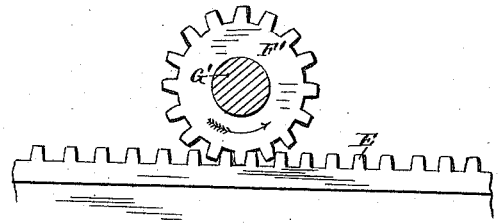
FIG. 6.
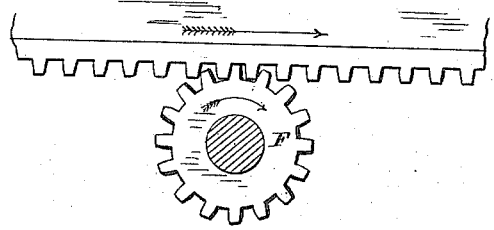
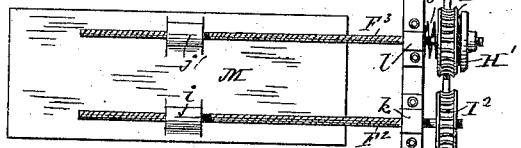
FIG. 7.
WITNESSES:
Chas. F. Schmelz
George W. Winsor.
INVENTOR:
Alonzo T. Gifford
per S. Scholfield
attorney

UNITED STATES PATENT OFFICE.

ALENZA T. GIFFORD, OF HOPEDALE, MASSACHUSETTS.

MILLING-MACHINE.

SPECIFICATION forming part of Letters Patent No. 330,391, dated November 17, 1885.

Application filed May 23, 1885. Serial No. 166,511. (No model.)

*To all whom it may concern:*

Be it known that I, ALENZA T. GIFFORD, of Hopedale, in the county of Worcester and State of Massachusetts, have invented an Improvement in Milling-Machines, of which the following is a specification.

The nature of my invention consists in the improved combination of the revolving cutter with the sliding carriage, and improved means for operating the same, as hereinafter set forth.

Figure 1 is a side elevation and partial section illustrating my improvement. Fig. 2 is a plan view of the under side of the carriage and of the carriage-operating mechanism. Figs. 3 and 4 are detail views, partly in section, illustrating the proper action of a revolving cutter in performing its work. Fig. 5 is an end view of the sliding carriage and its attachments. Fig. 6 is a detail view showing the contact of the teeth of the pinions with the rack-teeth of the carriage. Fig. 7 is a detail view of a modification, showing the operation of the carriage by means of screws instead of the pinions and racks.

In the accompanying drawings, Figs. 3 and 4, A is the cutter-arbor of a milling-machine, upon which the cutter B is secured by means of the nut C. D is the piece of work in which a groove or channel, $a$, is to be cut, and in performing work of this kind on a milling-machine as ordinarily constructed it has been the universal practice to move the piece of work D in a direction contrary to the movement of the under side of the cutter, as shown by the arrows in Fig. 3; but I have found by experiment that the action of the cutter when so operated is such as to cause a slight chattering, which results in the production of a comparatively uneven surface, the chips from the cutter being liable to interfere with the cutter-teeth in obtaining a proper hold upon the metal in front of the same, and I have also discovered by practical experiment that when the piece of work and the bottom edge of the cutter are made to move in the same direction, as shown by the arrows in Fig. 4, the chips carried over with the teeth of the cutter will not interfere with the production of uniformly smooth work, and likewise in cutting grooves having comparatively thin partitions between them the cutter when revolved as shown in Fig. 3 would tend to cause the partitions to spread away from the cutter, whereas when revolved as shown in Fig. 4 the thin partitions between the parallel grooves would be kept in true line and in perfect condition; and in order to adapt a milling-machine for the employment of a cutter revolving as shown in Fig. 4 it is necessary to hold the sliding carriage firmly in both directions of its movement without backlash; and to this end I attach racks E E' to the opposite edges of the carriage, into the teeth of which are geared the pinions F F', securely keyed to the upright shafts G G', and to the lower end of the shaft G' is securely pinned the friction-plate H, provided with the annular inclined friction-surface $a$, and above the plate H, and loose upon the shaft G', is placed the worm-gear I', which is provided with an inclined friction-surface $b$, adapted for frictional engagement with the plate H. Upon the shaft G', between the pinion F' and the loose worm-gear I', is placed the spiral spring J, which serves to hold the worm-gear in proper frictional engagement with the friction-plate. The worm-gear I' may therefore be revolved by means of the worm L' without imparting a corresponding movement to the shaft G'. The opposite upright shaft, G, is also provided at its lower end with the worm-gear I, which is securely keyed to the said shaft, and upon the transversely-directed shaft K, which is to be held in suitable bearings, (not shown in the drawings,) are secured the right and left hand worms L L', which engage with the worm-gears I I' respectively. The proper revolution of the shaft K will cause the gears I I' and pinions F F' to revolve in opposite directions, thus causing a progressive movement of the sliding carriage M of the milling-machine. The number of teeth in the worm-gear I' is made less than that of the opposite worm-gear, I, so that upon revolving the worms L L' in either direction the gear I', which frictionally operates the pinion F' by turning faster than the positively-operated worm-gear I at the opposite side of the carriage will operate to take up the backlash of the racks and pinions, and thus serve to prevent the cutter from acting injuriously upon the work.

In Fig. 1 the cutter B, which is held upon the arbor A of the milling-machine, is represented as cutting a groove, $g$, in a cylindrical bar, O, held as usual upon centers $h\ h'$, which are firmly bolted to the sliding carriage M, the arbor and cutter being made to revolve in the direction indicated by the arrow marked above the cutter, the piece of work D being also fed to the cutter in the direction of the arrow marked under the bar O. The friction between the worm gear I' and the friction-plate H is to be so adjusted in degree as to be amply sufficient to cause the forward movement of the carriage by overcoming the friction of the carriage-slides, and upon revolving the shaft K in the proper direction to feed the piece of work up to the cutter the frictionally-driven pinion F' will, by reason of the smaller number of teeth in the worm-wheel I' than in the opposite worm-wheel, I, tend to move the carriage faster than the corresponding movement of the positively-driven pinion F, thus causing the pinion F to act as a moving stop or check, and not as a driver of the carriage, the teeth of the rack E being caused by the more rapid motion of the pinion F' to bear firmly against the back of the teeth of the pinion F, as shown in Fig. 6, instead of bearing against the front of the same, which would be the case if the carriage were to receive its proper forward movement by power transmitted through the pinion F.

Fig. 7 is a detail view representing the under side of the carriage M as driven by means of two screws, $F^2$ and $F^3$, the screw $F^2$ passing through the lug $i$, and the screw $F^3$, which may be made of the same pitch as the screw $F^2$, passes through the lug $j$, so that the simultaneous turning of the screws will serve to cause the proper forward and backward movement of the carriage. The screw $F^2$ is held in a suitable fixed bearing, $k$, and has upon its outer end an attached worm-wheel, $I^2$. The screw $F^3$ is held in the fixed bearing $l$, and is provided at its outer end with the friction-plate H', secured to the screw, and the loose worm-gear $I^3$, with the spring J', adapted for holding the worm-gear in frictional contact with the friction-plate. Upon the transverse shaft K' are secured suitable worms for operating the worm-gears $I^2\ I^3$, the worm-gear $I^3$ having a less number of teeth than the corresponding gear, $I^2$, upon the screw $F^2$. The screw $F^3$, upon which the loose frictionally-driven gear $I^3$ is placed, will therefore be driven faster than the positively-driven screw $F^2$, and by this means the backlash will be taken up, as in the case of the gears and racks hereinbefore described.

I claim as my invention—

1. In a milling-machine, the combination of the revolving cutter and the feeding-carriage, arranged for forward movement, as set forth, with a frictional driving means and a positively-driven checking means for controlling the forward movement of the frictionally-driven carriage, substantially as described.

2. In a milling-machine, the combination of the revolving cutter B, sliding carriage M, racks E E', shafts G G', pinions F F', worm-gear I, firmly secured to the shaft G, worm-gear I', made loose upon the shaft G', and adapted for frictional engagement with the plate H, the friction-plate H, secured to the shaft G', spring J, adapted to hold the gear I' in frictional engagement with the plate H, and the driving-worms L L', adapted to revolve the gears I I', substantially as and for the purpose specified.

ALENZA T. GIFFORD.

Witnesses:
SOCRATES SCHOLFIELD,
CHAS. F. SCHMELZ.